F. C. SCHEVE.
APPARATUS FOR PREPARING AND DISCHARGING FEED.
APPLICATION FILED JULY 19, 1920.

1,383,489.                                   Patented July 5, 1921.

Inventor,
F. C. Scheve, by
G. C. Kennedy,
Attorney.

UNITED STATES PATENT OFFICE.

FRETS C. SCHEVE, OF SUMNER, IOWA, ASSIGNOR OF FORTY-FIVE ONE-HUNDREDTHS TO CRENO P. BETTENGA, OF WATERLOO, IOWA, AND FIVE ONE-HUNDREDTHS TO FRED W. BATHKE, OF SUMNER, IOWA.

APPARATUS FOR PREPARING AND DISCHARGING FEED.

1,383,489.  Specification of Letters Patent.  Patented July 5, 1921.

Application filed July 19, 1920. Serial No. 397,357.

*To all whom it may concern:*

Be it known that I, FRETS C. SCHEVE, a citizen of the United States of America, and a resident of Sumner, Bremer county, Iowa, have invented certain new and useful Improvements in Apparatus for Preparing and Discharging Feed, of which the following is a specification.

My invention relates to improvements in apparatus for preparing and discharging feed, and the object of my improvement is to supply an apparatus for heating or cooking, mixing, combining and preparing liquid or semi-liquid feed for hogs and other animals, the apparatus having convenient means for discharging its contents, and containing a special scraping vessel useful for removing adherent coatings from the feed container.

Figure 1:
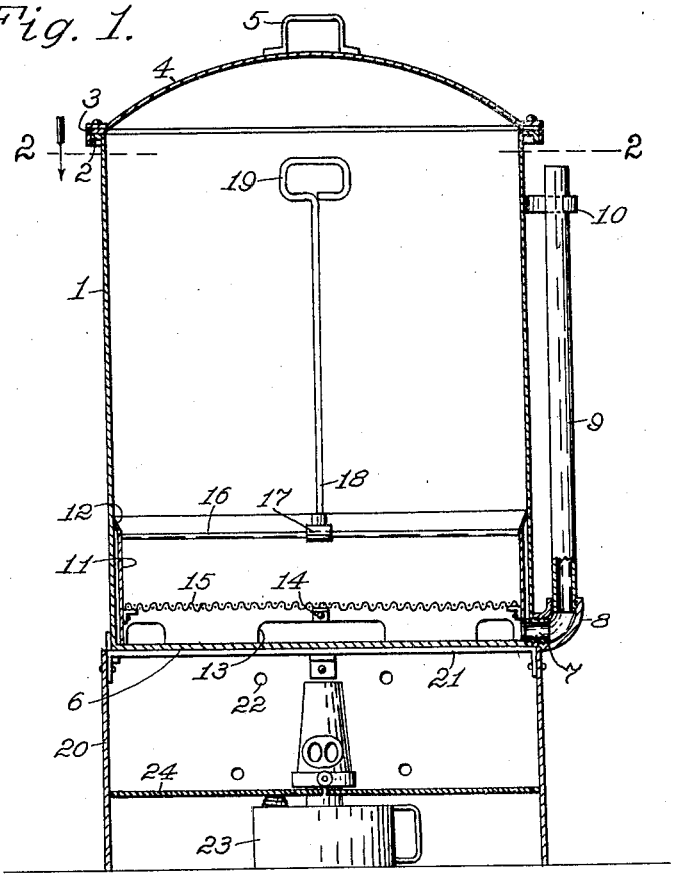
Figure 2:
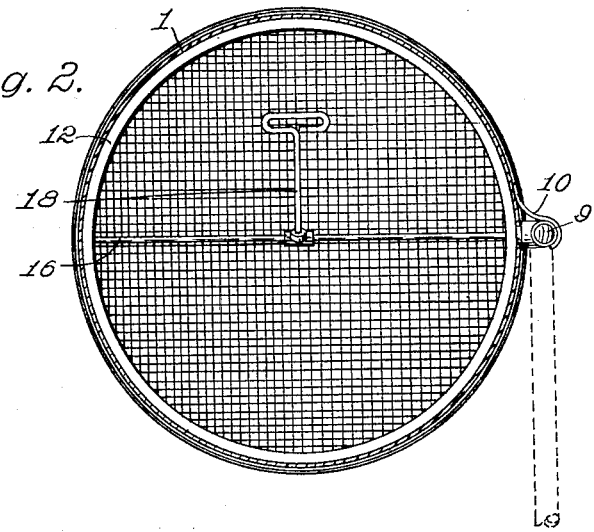

This object I have accomplished by the means which are hereinafter described and claimed, and which are illustrated in the accompanying drawings, in which Figure 1 is a central vertical section of my improved apparatus, and Fig. 2 is a horizontal section, looking downwardly, taken on the broken line 2—2 of Fig. 1.

Similar numerals of reference denote corresponding parts throughout the several views.

My improved apparatus is intended for use in the mixing and proper combining of tankage and other substances with milk or other liquids and the heating and cooking thereof for animal feed.

The numeral 1 denotes a cylindrical container or boiler having a closed bottom 6 and an open top provided with a removable closure 4 having a handle 5. The upper edge part of the container 1 is offset outwardly and then downwardly to form a stiff channeled rim. Upon the lower surface of the outer flattened marginal edge of said closure 4 is fixed an annular angle-plate 3 which fits closely upon and over the channeled rim 2. Any suitable heating device, such as a lamp 23, may be positioned under the bottom 6 of said container to heat its contents, and this heating means may be inclosed within a housing 20. Cross-bars 21 may be fixedly secured across the top of the housing to support said container thereon removably. To prevent escape of heat from said housing, a removable horizontal partition 24 may be positioned across the interior of the housing, and may be made in two parts, centrally orificed to seat it about the wick conduit of the lamp above the lamp bowl 23, and this also isolates the heated air above the partition from the contents of the bowl. The housing may have a plurality of small openings 22 for ventilating purposes.

To conveniently discharge the liquid or semi-liquid contents of the boiler 1 into a bucket or other container without, I have provided an exteriorly threaded nipple 7 communicating with the bottom of the boiler, and upon which is mounted to rock thereon the interiorly threaded elbow 8 in which is fitted the lower end of a discharge-pipe 9. As indicated by the dotted lines in Fig. 2, this pipe may be rocked with said elbow on said nipple from a vertical to a horizontal or an inclined position and back. When rocked back to its vertical position, said pipe is received yieldingly and held by a spring clip 10 mounted on the upper part of the boiler. This discharging device is very convenient in filling buckets, and obviates any necessity for removing the closure 4 to dip out the contents of the boiler.

The numeral 11 denotes a cylindrical body, open at top and bottom and positioned within the boiler 1 resting upon the bottom 6 thereof. Portions of the lower part of the body 11 are cut away at 13 to permit free passage therethrough of liquids to the nipple 7. The cylindrical body 11 is preferably of slightly less diameter than the interior of the boiler 1, and has its upper edge upset slopingly outwardly to slidingly contact with the inner wall of the boiler to serve as a scraping means therefor, as shown at 12. The numeral 15 denotes a reticulated bottom for the body 11, spaced from the lower edge thereof and supported on brackets 14. A rod 16 is fixed across the open top of the body 11, and on its middle is mounted to rock thereon a sleeve 17 having a nipple in which is fixed the lower end of an upwardly directed rod 18 having at its upper end a looped handle 19.

Tankage, milk, or any other liquid or semi-liquid substances suitable for animal feed, are deposited within said boiler and received upon the reticulated body 15 of the cylindrical body 11. This netted bottom 15 permits the more liquid part of the contents to pass through, holding back clotted or semi-liquid substances which might form a layer upon the bottom 6 and become baked thereon. The handle 18—19 is used to slidingly reciprocate the body 11, agitating the contents and thoroughly mixing same. The scraping edge 12 thoroughly scrapes the interior wall of the boiler 1, removing adherent matter which otherwise forms a thick coating. This body 11 is readily removed for cleansing.

Various modifications may be effected in the devices of my said apparatus without departing from the principles of the invention.

Having described my invention, what I claim as new, and desire to secure by Letters Patent, is:

In combination, an orificed housing containing heating means, a container removably positioned upon said housing, a reticulated strainer removably mounted in said container spaced above the bottom thereof and having a raised rim spaced from the inner circumferential wall thereof with a sharpened top scraping edge inclined toward and contacting with said wall, a delivery-spout in communication with the bottom part of said container, mounted to rock from a raised to a lowered position, and a resilient clip mounted on said container and adapted to receive and releasably hold said spout when the latter is in its raised position.

Signed at Waterloo, Iowa, this 25th day of June, 1920.

FRETS C. SCHEVE.